United States Patent
Holtman

(10) Patent No.: US 9,320,065 B2
(45) Date of Patent: Apr. 19, 2016

(54) WIRELESS DOCKING AUTOMATIC CONFIGURATION AND OPTIMIZATION SYSTEM

(71) Applicant: KONINKLIJKE PHILIPS N.V., Eindhoven (NL)

(72) Inventor: Koen Johanna Guillaume Holtman, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days.

(21) Appl. No.: 14/382,613

(22) PCT Filed: Mar. 5, 2013

(86) PCT No.: PCT/IB2013/051720
§ 371 (c)(1),
(2) Date: Sep. 3, 2014

(87) PCT Pub. No.: WO2013/132421
PCT Pub. Date: Sep. 12, 2013

(65) Prior Publication Data
US 2015/0072614 A1    Mar. 12, 2015

Related U.S. Application Data

(60) Provisional application No. 61/607,114, filed on Mar. 6, 2012, provisional application No. 61/718,228, filed on Oct. 25, 2012.

(51) Int. Cl.
*H04W 76/02*    (2009.01)
*G06F 1/16*    (2006.01)
*H04L 12/721*    (2013.01)
*H04W 24/02*    (2009.01)

(52) U.S. Cl.
CPC ............. *H04W 76/02* (2013.01); *G06F 1/1632* (2013.01); *H04L 45/127* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 2002/0071416 A1* | 6/2002 | Carlson | H04W 48/20 370/338 |
| 2005/0041591 A1 | 2/2005 | Duggi | |
| 2006/0203746 A1* | 9/2006 | Maggenti | H04L 41/0806 370/254 |
| 2007/0127417 A1* | 6/2007 | Kalika | H04L 12/2456 370/338 |
| 2008/0159144 A1* | 7/2008 | Nagarajan | H04L 45/124 370/235 |
| 2009/0116393 A1* | 5/2009 | Hughes | H04L 45/122 370/238 |
| 2010/0128695 A1* | 5/2010 | Nagaraja | H04W 76/023 370/331 |

FOREIGN PATENT DOCUMENTS

WO    WO2009141761 A1    11/2009

* cited by examiner

*Primary Examiner* — Alejandro Rivero
(74) *Attorney, Agent, or Firm* — Larry Liberchuk

(57) ABSTRACT

The present invention provides systems, methods and apparatus that pre-plan the payload connections of multiple dockees with a stationary docking environment in a docking process in accordance with a connection negotiation process which balances the needs and capabilities for all parties participating in the docking process. In accordance with one disclosed aspect, a connection negotiation system establishes one or more communication paths between one or more pairs of end points located in devices in a communication system.

14 Claims, 8 Drawing Sheets

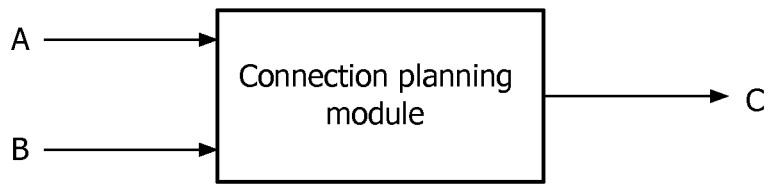

A = one or more pairs of end-points of cummunication paths located in devices of the communication system, each end-point being represented by an interface data element M, where the interface data elements of M may be represented as:

B = { ① ② ③ ④ }

B = description of capabilities and constraints of at least two devices in the communication system and a communication medium. The capabilities and constraints defined by a set B of block data elements where the block B data elements may be represented as:

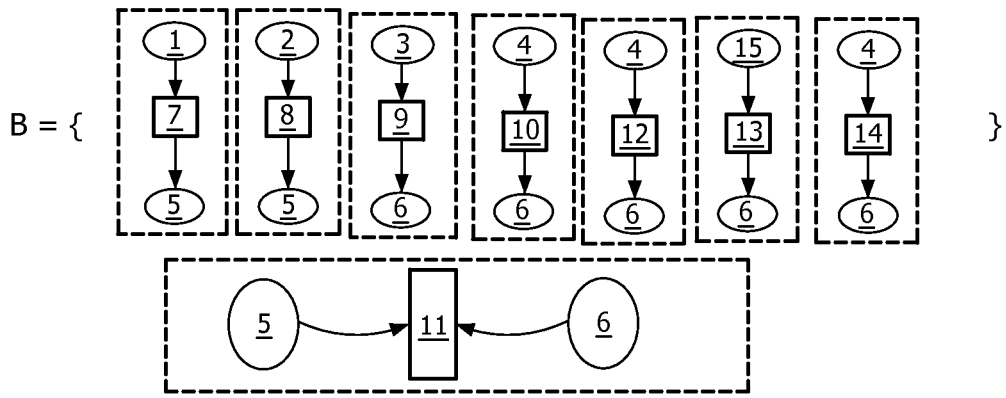

C = a subset Tx of the set B of block data elements that satisfies at least a first criteria based on the first and second inputs.

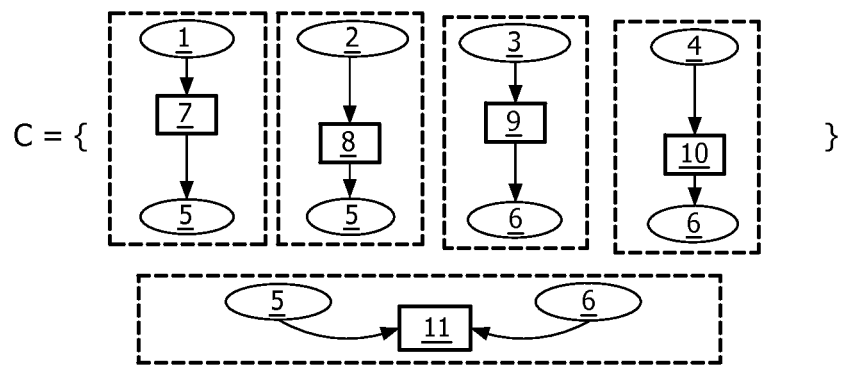

FIG. 6

WIRELESS DOCKING AUTOMATIC CONFIGURATION AND OPTIMIZATION SYSTEM

CROSS REFERENCE TO RELATED APPLICATIONS

This application claims benefit of U.S. provisional application, Ser. No. 61/607,114, entitled "Connection Negotiation for Wireless Docking", filed in the USPTO on Mar. 6, 2012, and also claims benefit of U.S. provisional application, Ser. No. 61/718, 228, entitled "Wireless Docking Automatic Configuration and Optimization System", filed in the USPTO on Oct. 25, 2012.

BACKGROUND

1. Field of the Invention

The present invention relates in general to wireless data communication between different computer devices, and in particular, to a docking system and method for automatically configuring an optimal network topology and device driver settings for the network.

2. Description of the Related Art

Wireless docking employs wireless technologies to connect typically portable devices, such as mobile phones, laptops, to typically stationary docking environments. Such portable devices are typically referred to as a dockee or wireless dockee (WD). In wireless docking, the dockee connects wirelessly to a docking environment, which can be one or more docking stations (WDS) or docking hosts (WDH) in order to gain access to the peripherals in the docking environment, such as a large screen, keyboard, mouse and input/output ports provided by the docking environment. In a typical application, a mobile phone user is provided with a capability to use a larger screen than what is provided on the mobile phone when interacting with an application (e.g., e-mail client, web browser) running on the mobile phone. The use of a larger screen improves the experience and productivity of the end user when interacting with applications running on the dockee.

Current and future envisioned wireless docking standards under development envision that a docking environment can be implemented in a distributed way, consisting of several devices and communication links.

Given the afore-mentioned limitations and considerations, it is clear that the process of setting up optimal connections in a docking system, referred to herein as connection negotiation, involves at the very least, combining communication protocols, chip settings, channel assignments and routing topologies in a manner which balances the needs and capabilities for all parties participating in the docking process. Moreover, assessing the different possible solutions on their merits can be a difficult task on its own. Ideally, there are several metrics that should be optimized. They are, network topology throughput and latency with particular reference to the throughput of screen updates sent to and from a dockee to a screen peripheral function.

In light of the above drawbacks and concerns, it should be apparent that a dockee proposing to dock with a wireless docking environment is presented with the immediate problem of how to perform a connection negotiation process that combines communication protocols, chip settings, channel assignments and routing topologies in a manner which balances the needs and capabilities for all parties participating in the docking process. As discussed above, the problem is not trivial, as the choice of certain settings in one part of the system influence the performance in another part of the system. Even finding a single combination of settings that creates a fully connected communication graph can be complex in some setups.

Therefore, what are needed are systems, methods and computer program products for providing a connection planning strategy that implements a connection negotiation process to connect wireless dockees to a wireless docking environment.

SUMMARY OF THE INVENTION

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

The invention, in various embodiments, addresses deficiencies in the prior art by providing systems and methods that pre-plan the payload connections of dockees with a stationary docking environment in a docking process in accordance with a connection negotiation process which balances the needs and capabilities for all parties participating in the docking process.

In accordance with one disclosed aspect, a communication system including a connection negotiation system for establishing one or more communication paths between one or more pairs of end points located in devices of the communication system is disclosed, wherein the communication system comprises: two or more devices, at least one communication medium situated between the two or more devices, a plurality of system elements that can be used to realize a part of the one or more communication paths to be established, a plurality of interface data elements representing one of connection points between system elements, connection points between a system element and an end point of the one or more communication paths to be established, wherein the connection negotiation system comprises at least one processor operative to: receive as a first processor input, one or more pairs of end points of the one or more communication paths to be established, said end points being located in devices of the communication system, where each end point is represented by one of the plurality of interface data elements, receive as a second processor input, a description of capabilities and constraints of the at least two devices and optionally the communication medium, wherein the capabilities and constraints are defined by a set B of block data elements, wherein a block data element in the set B of block data elements is comprised of data that represents a single system element that is configured to perform a certain communication task, or a single system element that cannot be configured, or a single system element that is always configured in the same manner irrespective of the one or more communication paths that is supported by it, find a subset Tx of the set B of block data elements that satisfies at least a first criteria based on the first and second inputs, and output the subset Tx as a connection plan, representative of the one or more communication paths to be established in the communication system, execute the connection plan by at least configuring one or more system elements as specified by the subset Tx to establish the one or more communication paths in the communication system.

In accordance with a second aspect of the present invention, a method for establishing one or more communication paths between one or more pairs of end points located in devices of a communication system is disclosed comprising: two or more devices, at least one communication medium situated between the two or more devices, a plurality of system elements that can be used to realize a part of the one or more communication paths to be established, a plurality of interface data elements representing connection points between system elements, and connection points between a system element and an end point of a communication path to be established, the method comprising: receiving as a first input, the one or more pairs of end points of the one or more communication paths to be established, said end points being located in devices of the communication system, where each end point is represented by one of the plurality of interface data elements, receiving as a second input, a description of capabilities and constraints of the at least two devices and optionally the communication medium, wherein the capabilities and constraints are defined by a set B of block data elements, wherein a block data element in the set B of block data elements is comprised of data that represents a single system element that is configured to perform a certain communication task, or a single system element that cannot be configured, or a single system element that is always configured in the same manner irrespective of the one or more communication paths that is supported by it, finding a subset Tx of the set B of block data elements that satisfies at least a first criteria based on the first and second inputs, and outputting the subset Tx as a connection plan, representative of the one or more communication paths to be established in the communication system, and executing the connection plan by configuring one or more system elements as specified by the subset Tx to establish the one or more communication paths in the communication system.

In accordance with a third aspect of the present invention, a dockee in a communication system hosting a connection negotiation system is disclosed for establishing one or more communication paths between one or more pairs of end points located in devices of the communication system, wherein the communication system comprises: two or more devices, at least one communication medium situated between the two or more devices, a plurality of system elements that can be used to realize a part of the one or more communication paths to be established, a plurality of interface data elements representing one of (a) connection points between system elements, (b) connection points between a system element and an end point of the one or more communication paths, wherein the connection negotiation system hosted by said dockee comprises at least one processor operative to: a) receive as a first processor input, the one or more pairs of end points of the one or more communication paths to be established, said end points being located in devices of the communication system, where each end point is represented by one of the plurality of interface data elements, receive as a second processor input, a description of capabilities and constraints of the at least two devices and optionally the communication medium, wherein the capabilities and constraints are defined by a set B of block data elements, wherein a block data element in the set B of block data elements is comprised of data that represents a single system element that is configured to perform a certain communication task, or a single system element that cannot be configured, or a single system element that is always configured in the same manner irrespective of the one or more communication paths that is supported by it, find a subset Tx of the set B of block data elements that satisfies at least a first criteria based on the first and second inputs, and output the subset Tx as a connection plan, representative of the one or more communication paths to be established in the communication system, initiate execution of the connection plan, the execution comprising configuring one or more system elements as specified by the subset Tx to establish the one or more communication paths in the communication system.

In accordance with a fourth aspect of the present invention, a docking host in a communication system hosting a connection negotiation system for establishing one or more communication paths between one or more pairs of end points located in devices of the communication system is disclosed, wherein the communication system comprises: two or more devices, at least one communication medium situated between the two or more devices, a plurality of system elements that can be used to realize a part of the one or more communication paths to be established, a plurality of interface data elements representing (a) connection points between system elements, and (b) connection points between a system element and an end point of the one or more communication paths, wherein the connection negotiation system hosted by said docking host comprises at least one processor operative to: receive as a first processor input, the one or more pairs of end points of the one or more communication paths to be established, said end points being located in devices of the communication system, where each end point is represented by one of the plurality of interface data elements, receive as a second processor input, a description of capabilities and constraints of the at least two devices and optionally the communication medium, wherein the capabilities and constraints are defined by a set B of block data elements, wherein a block data element in the set B of block data elements is comprised of data that represents (a) a single system element that is configured to perform a certain communication task, or (b) a single system element that cannot be configured, or (c) a single system element that is always configured in the same manner irrespective of the one or more communication paths that is supported by it, find a subset Tx of the set B of block data elements that satisfies at least a first criteria based on the first and second inputs, and output the subset Tx as a connection plan, representative of the one or more communication paths to be established in the communication system, initiate execution of the connection plan, the execution comprising configuring one or more system elements as specified by the subset Tx to establish the one or more communication paths in the communication system.

BRIEF DESCRIPTION OF THE DRAWINGS

These and other objects, features and advantages of the invention will be apparent from a consideration of the following Detailed Description Of The Invention considered in conjunction with the drawing figures in which:

FIG. 6—illustrates the inputs and output of a connection planning module of the invention, according to one embodiment.

DETAILED DESCRIPTION OF THE INVENTION

Figure 1:
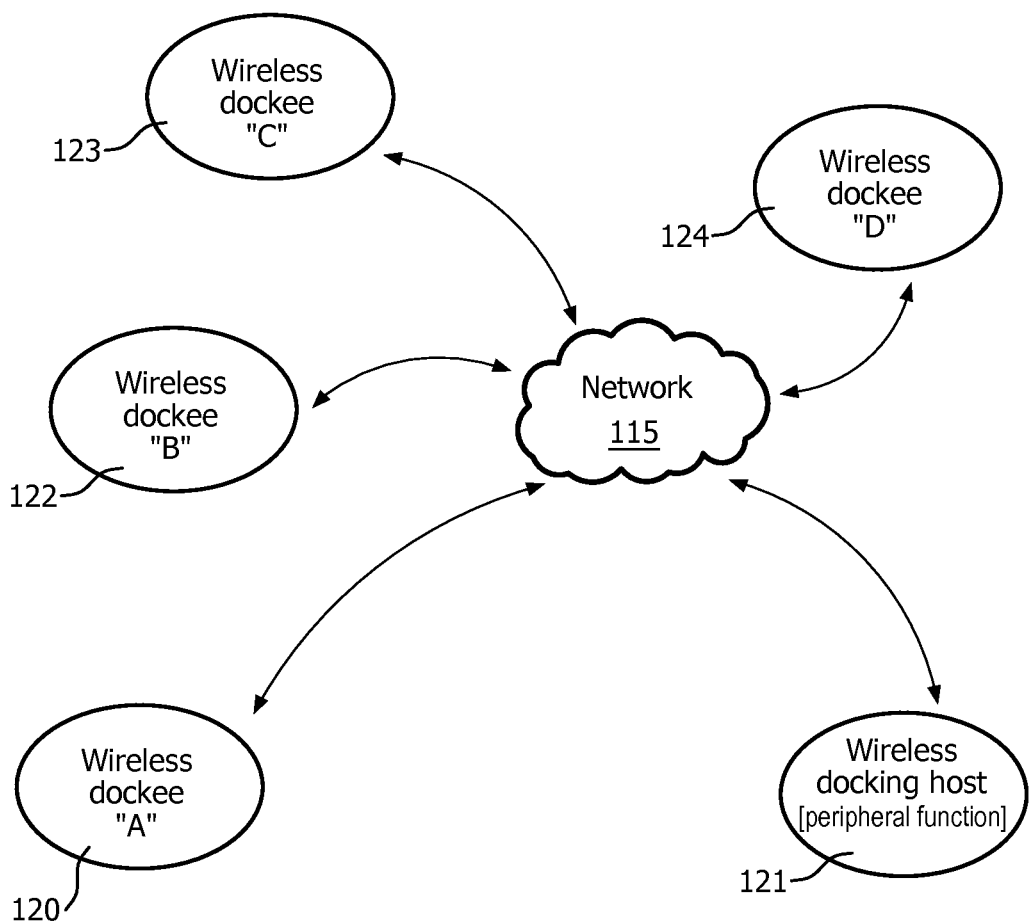
FIG. 1—is an exemplary docking environment in which the present invention may be implemented, according to one embodiment.

Non-limiting embodiments of the present invention will now be disclosed in detail, by way of example, with reference to the drawings. In describing those embodiments, specific terminology will be resorted to for the sake of clarity. However, the invention is not intended to be limited to the specific terms so selected, and it is to be understood that each specific term includes all technical equivalents that operate in similar manner to accomplish a similar purpose.

The present description illustrates the principles of the present disclosure. It will thus be appreciated that those skilled in the art will be able to devise various arrangements that, although not explicitly described or shown herein, embody the principles of the disclosure and are included within its spirit and scope.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different modules of methods employed, the terms should not be interpreted as implying any particular order among or between various steps herein disclosed unless and except when the order of individual steps is explicitly described.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The embodiments of the present invention may comprise a special purpose or general purpose computer including various other computer hardware and/or software modules and modules, as discussed in greater detail below.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes either a general component that is temporarily configured to perform the task at a given time or a specific component that is manufactured to perform the task. In general, the order of the steps of disclosed processes may be altered within the scope of the invention.

The term 'connection planning module', as referred to herein, represents one or more related modules comprising executable code executed on a at least one processor coupled to a memory. The connection planning module is configured to solve a connection negotiation problem by establishing a connection plan. More particularly, the connection planning module pre-plans the 'payload' connections of one or more dockees with one or more stationary docking environments in a docking process, where a payload connection is used to interact with a peripheral function in a docking environment. The connection planning module computes a set of communication paths that is both optimal, or nearly optimal, and feasible to realize, by balancing the needs and capabilities for all parties participating in the docking process.

The term 'connection negotiation', as referred to herein, refers to a system in which connections are to be set up between a dockee and one or more docking hosts. The dockee and docking hosts are collectively referred to as devices, which may be encountering each other for the first time.

Exemplary Application Environment

Referring now to FIG. 1, there is shown a number of portable devices (e.g., mobile phones, laptops, etc., which are generally referred to herein as wireless dockees, wireless dockee "A" 120, wireless dockee "B" 122, wireless dockee "C" 123, wireless dockee "D" 124. It is an object of the invention to find an optimal or near optimal setup for payload connections between one or more of the wireless dockees and one or more wireless docking hosts, such as wireless docking host 121.

In a connection negotiation process, the parties in a wireless docking system communicate and agree on an optimal or near optimal set-up for payload connections to support interactions between the application software and the dockee and peripheral function hardware. More generally, payload connections are examples of communication paths. A communication path is a generalization of a payload connection in that it includes connections outside of the scope of wireless docking, e.g. connections between two software application programs. A communication path can describe a connection between an application and a peripheral.

Figure 2:
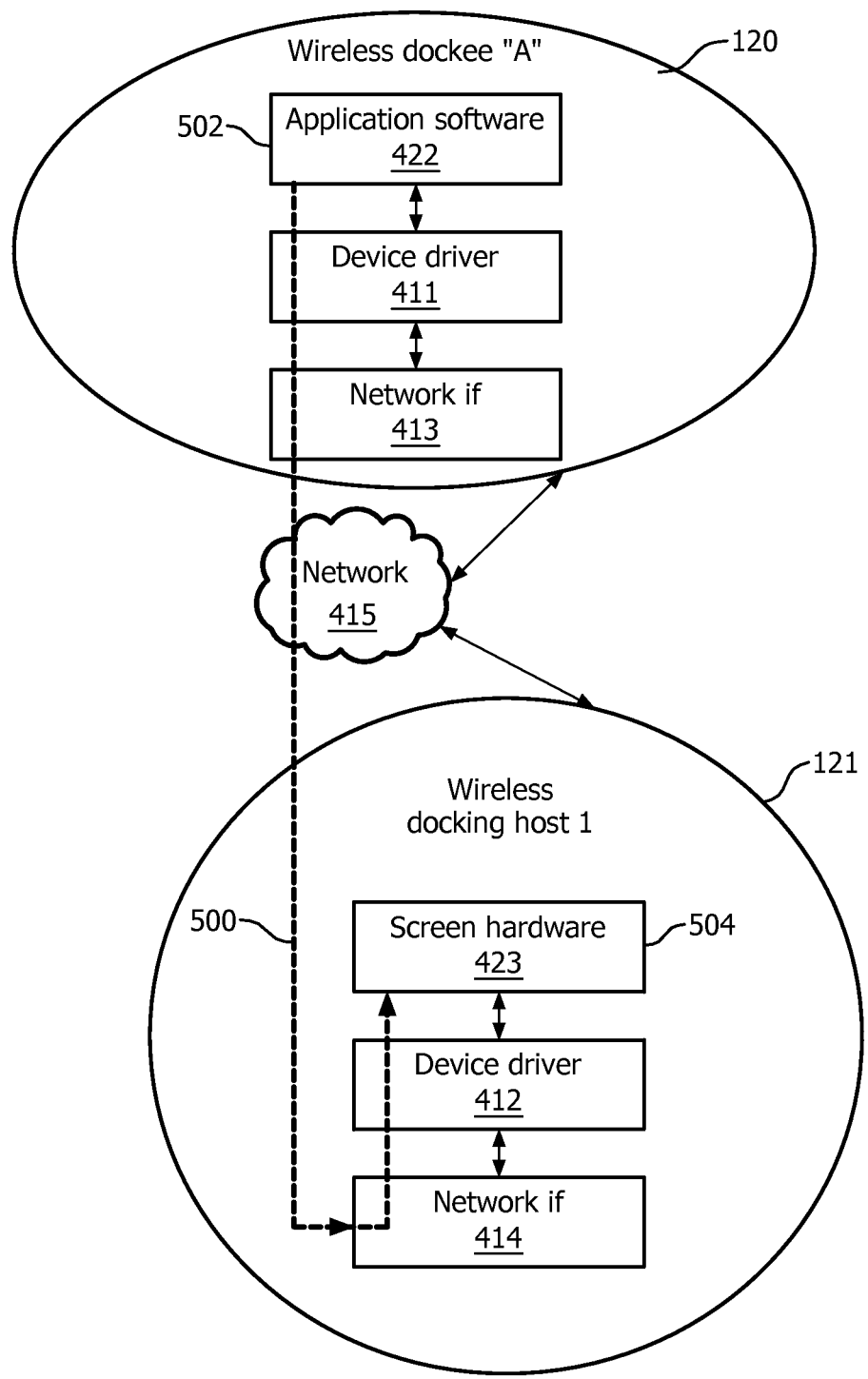
FIG. 2—is an illustration of an exemplary communication path created by a connection planning module of the invention connecting an application software module of a wireless dockee "A" with a screen hardware module of a wireless docking host, according to one embodiment.

Referring now to FIG. 2, there is shown a communication path 500 created as a result of a connection negotiation process managed and executed by the connection planning module 550 of FIG. 5. The communication path 500 consists of first and second respective end points 502, 504. A first end point 502 is associated with application software program 422 of the wireless dockee "A" 120 and the second end point 504 is associated with screen hardware 423 associated with a wireless docking host 121. The communication path traverses five system elements, including device driver 411, network IF 413, wireless network 415, network IF 414, and device driver 412.

The communication path 500 enables a bi-directional data flow between application software program 422 and the screen hardware 423. The data to be communicated between these two devices may also be transformed e.g. by lossless or lossy (video) compression, by one or more system elements in the communication path, such as, for example, device driver 411 associated with dockee A 120. The communication path 500 is established as a result of computations performed by connection planning module 550 (not shown, see FIG. 5) by, and therefore satisfies the connection plan created by the connection planning module 550.

Wireless docking envisages that networks like 415 will most often be Wifi direct based networks established specifically, as a result of the output of the connection planning module 550, to optimize communications. Similarly, the invention also envisages that system elements like device driver 412, network IF 414, network IF 413 can be specifically configured to establish the paths planned by the connection planning module 550. In some embodiments, in addition to establishing the paths, one or more new WIFI direct networks may be created as a result of the computations by the connection planning module 550.

Figure 4:
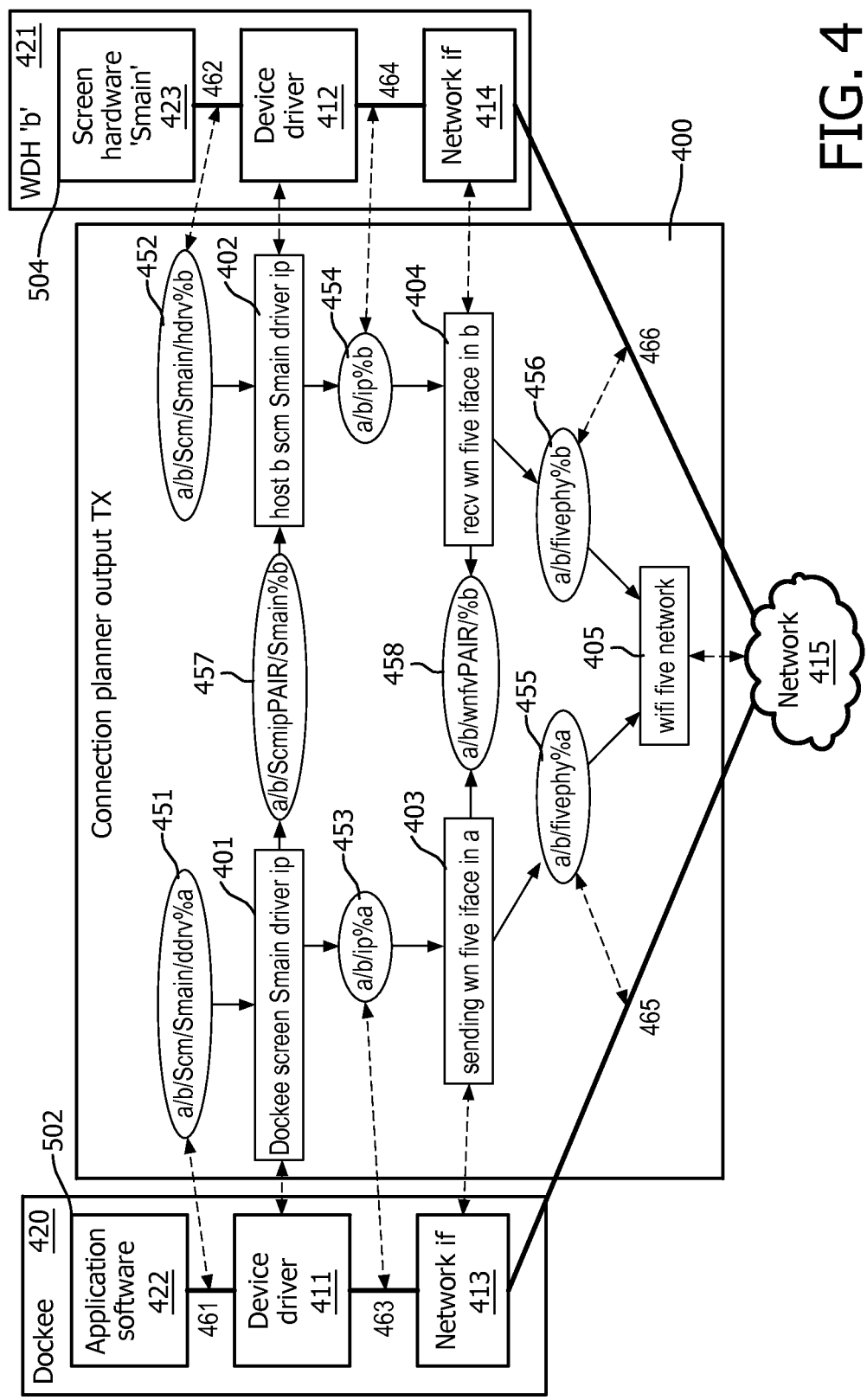
FIG. 4—is an illustration of an exemplary negotiation result of a connection negotiation conducted between a dockee and a wireless docking host, according to one embodiment.

According to the invention, each endpoint of a communication path endpoint pair is typically located in a different device. For example, with reference to FIG. 2, the communication pair endpoints are located at the edges of application software module 422 in wireless dockee "A" 120 and screen hardware module 423 in wireless docking host 121. These endpoints need to be connected via communication paths, such as communication path 500, where each communication path typically includes at least one network connection, such as network 415 as shown in FIG. 4.

A typical network connection could be, for example, a wireless connection via a WiFi network on a certain channel, or a wired connection. The communication paths typically include device drivers, such as device drivers 411, 412. A device driver can sometimes be specifically chosen to be optimal when used with a particular wireless network connection. For example, a device driver that implements a higher level device access protocol on top of a lower level transport protocol. Also, communication paths optionally use one device to relay between end points located in two other devices.

The connection planning module 550 computes a set of communication paths that is both optimal, or nearly optimal, and feasible to realize, given the capabilities and constraints of the devices in the communication system. The capabilities and constraints of each device in the communication system can be encoded using an encoding scheme to be described more fully further below. In a preferred embodiment, the encoding scheme has the property that the capabilities and constraints of each separate device can be encoded independently, as a device specific information package. Encoding can be done at device design time or at the factory, when the device is being created, or by specialized code contained within the device. Optionally, properties and/or usage constraints of the wireless medium between the devices can also be encoded as an information package using the encoding scheme.

The connection planning module 550 provides various capabilities including but not limited to, combining the device specific information packages of all devices in the system, information about the end points of the system elements to be paired, optionally information about the wireless medium, and additional optional information to compute the communication paths.

Typically, the connection planning module 550 runs on a processor inside one of the devices in the system. In some embodiments, it is contemplated to use a distributed implementation of the connection planning module 550.

Constructing the device specific information packages as one input of the connection planning module 550 pre-supposes that communications between supervisory modules in the devices have already been established. The connection planning module 550 plans the 'payload' connections to support interactions with peripheral functions and does not establish initial communications between devices according to discovery and handshake protocols.

In various embodiments, the connection planning module 550 may be located in any one of devices in the communication system given that there is no requirement that the connection planning module 550 be located in a particular device.

Figure 5A:
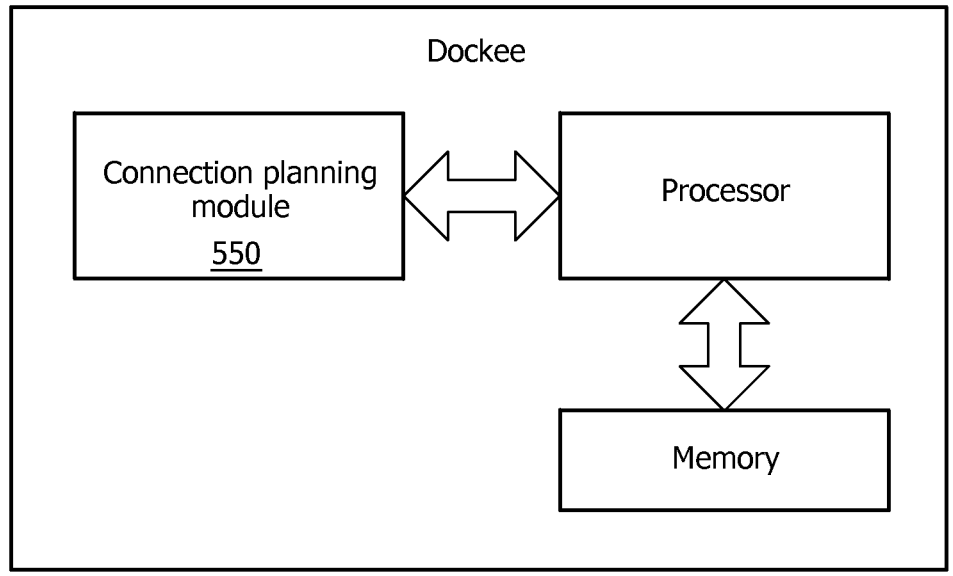
FIGS. 5a & 5b—illustrate a connection planning module coupled to a processor and memory hosted by a typical dockee (5a) and docking host (5b), according to one embodiment.
Figure 5B:
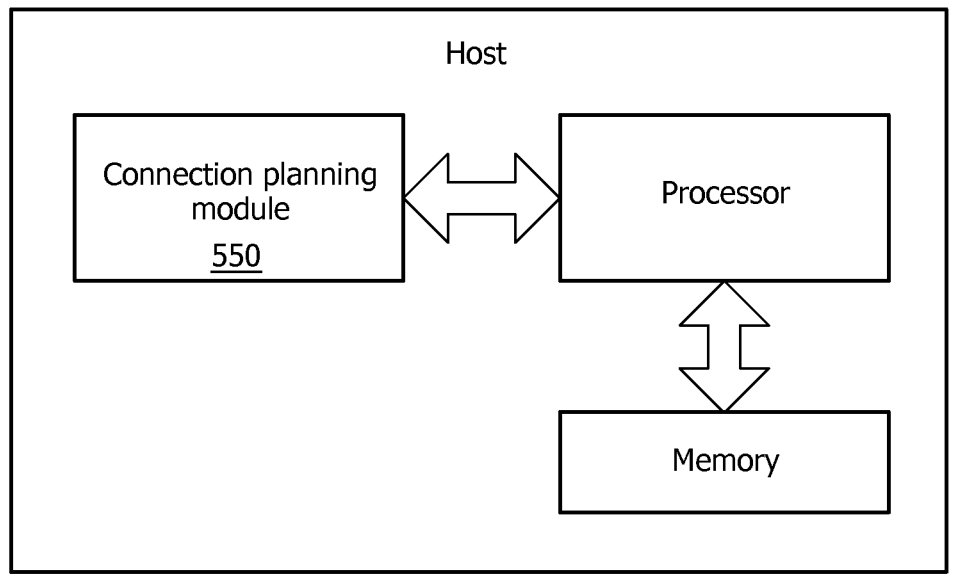

In the connection negotiation process, in a preferred embodiment, a wireless dockee assumes the role of hosting and running a connection planning module 550 for determining a communication route plan between a dockee and a docking host. In other embodiments, the docking host may assume the role of hosting and running the connection planning module 550. These different embodiments are shown by way of example in FIG. 5. For example, FIG. 5a illustrates a wireless dockee assuming the role of running the connection planning module 550, and in FIG. 5b a wireless docking host assuming the role of hosting the connection planning module 550.

In one embodiment, all devices implementing a wireless docking standard may include a capability to run the connection planning module 550 and collectively decide for each new session, which particular device in the communication system will run the connection planning module 550.

Information about the communication paths computed by the connection planning module 550 is communicated from the device hosting the connection planning module 550 to each device participating in the connection negotiation. The information is used by each device to realize its contribution to the computed communication paths, and to set up any required network connections between the devices.

As stated above, the connection planning module 550 computes representations of an optimized, or near optimized set of communication paths between pairs of end points located in different communication system devices, e.g., wireless dockee "A" 120 and Wireless Docking Host 121, as shown in FIGS. 2 and 4. The connection planning module 550 computes the optimized or near optimized set of communication paths between pairs of end points by operating on block and interface data elements, described as follows.

Interface Data Elements

An interface data element, which is sometimes referred to herein as an 'interface,' is a representation or model of an actual single interface point along a communication path, such as communication path 500. In some embodiments, an interface data element may serve more than one representational role. In one role, the interface data element may represent or model an actual single interface point along a communication path. In a different role, the interface data element may be used to encode device capabilities or constraints of devices in the communication system in ways that do not correspond directly to a single interface point along a communication path.

In other embodiments, interface data elements may be used to serve a single exclusive role to represent or model a single interface point. In these embodiments, an additional data element type is created to encode device capabilities or constraints.

In one embodiment, interface data elements may be encoded as ASCII strings. For example, FIG. 4 illustrates four interfaces 461, 463, located in dockee 420 and 462, 464 located in docking host 421, and their associated interface data elements, that represent them, encoded as the ASCII strings shown inside the oval shapes 451, 452, 453 and 454. The ASCII string depicted encodes the properties of the interface data element. Properties may include, for example, what kind of point along what kind of communication paths the interface represents. In a preferred embodiment, only those properties are encoded which are relevant for the purpose of connection planning. The ASCII strings which encode the properties of the interface (data element) can therefore be viewed as elements of a model that encodes system element capabilities and constraints, in such a way that the model can be operated on by the connection planning module 550 to generate realizable optimal or near-optimal communication paths involving system elements.

According to a beneficial aspect of the invention, the encoding scheme is somewhat flexible. That is, different embodiments may choose different encoding schemes, without requiring changes to the connection planning module 550.

In one embodiment, the set of interface data elements is the set of all ASCII strings. Two interface data elements from the set are said to be equal if their representations are the same ASCII string, where the equality relation is a string equality. In other embodiments, more complex equality tests could be used to determine if two interface data elements are at least substantially similar. Substantial similarity is defined herein as two interface elements representing the same point along a possible communication path. The encoding scheme used for interface data elements in a specific embodiment typically does not have the property that every possible ASCII string represents a valid or meaningful encoding of an interface.

The end points of communication paths are always represented by interface data elements. Thus, the set of communication paths to be computed by the connection planning module 550 is specified as a set of interface data element pairs that represent end points to be connected. With reference again to FIG. 2, the edges of communication path 500 comprise end-points 502, 504 which are interfaces that can be represented by interface data elements. With reference to FIG. 4, interface data elements 451 and 452 represent communication path end points, denoted by the interfaces 461 and 462, respectively, or alternatively by the edges of the elements 422 and 423.

Block Data Elements

A second type of data element, sometimes referred to herein as a "block" data element, is used to represent, or model, a communication system element, such as, for example, device driver 411 of FIG. 2 or network IF 414 of FIG. 2. The name "block" derives from the shape typically used in system diagrams and protocol stack diagrams to represent devices or modules or other system elements. In general, a system element is a real-world object that takes part in the realization of an actual communication path. The invention also contemplates 'wireless network spectrum' as a real-world object.

Referring again to FIG. 2, communication system elements 411, 412, 413, 414, and 415 are modeled by block data elements. However, certain objects shown in FIG. 2, such as, for example, device 420 and screen hardware 423, which are at the end points of the communication paths, are not represented or modeled by block data elements, and are consequently not referred to herein as system elements. In a preferred embodiment, the input about the end points of the desired communication path(s) that goes into the connection planner is supplied as a set of interface data elements (e.g. 451 and 452 in FIG. 4). In an alternative embodiment, the input might instead be given as block data elements that represent the elements 422 and 423 in FIG. 4, with these block data elements each having an interface, 451 for the first and 452 for the second, associated with them.

It should be understood that there is not always a one-to-one correspondence between a communication system element of the communication system and a block data element of the negotiation system which models the system element of the communication system. In a 'simple' case, a system element does have a one-to-one correspondence with exactly one block data element. However, in a 'non-simple' case, a single system element is represented by many block data elements. In this case, each block data element represents not just the system element, but the system element to which a certain specific configuration has been applied, with this configuration ensuring that the system element performs a certain function in realizing a part of a communications path. The many block data elements in this case all represent the same system element, but each block differs with respect to configuration settings represented by it. For example, in the 'non-simple' case a single block represents a 'configured system element', i.e., a system element with some configuration data that has been applied to it. It is noted that a complex system element like a network interface may be able to execute several sets of configuration data at the same time, for example a first configuration data set to establish a network connection to a first device, and a second configuration data set to establish concurrently a network connection to a second device. These two different configurations (data sets) of the system element can each be represented by two different block data elements.

The term "block data element" may encompass representations of system elements like devices, (software) modules, and in some cases, a network cloud 415. Metadata is typically associated with a block data element for describing type of block. For example, the metadata could describe that the block represents a network interface with settings to create certain connections, or a device driver with certain settings, or a network 'cloud' with certain properties.

Various combinations of block data elements and interface data elements collectively represent (realizable, unrealizable, and partial) communication paths to be generated and analyzed by the connection planning module 550 to identify those communication paths which are realizable.

A block data element, as it is input to the connection planning module 550, minimally comprises a set of related interface data elements, sometimes referred to herein as 'interfaces of the block'. A block data element may therefore be minimally represented as a set of records, each single record describing 1) a specific interface data element related to the block, e.g. the record can describe the interface data element by containing an ASCII string that encodes the interface data element and 2) the relation between the block data element and this specific interface data element, e.g. by the record containing an integer that encodes the type of relation. For the purpose of illustrating the invention, it is also convenient to refer to blocks data elements by using numbers, e.g. saying 'block data element number 7'.

Referring now to FIGS. 3a-3e, there is shown, by way of example, commonly applicable interface data elements and block data elements, as described above.

Figure 3A:
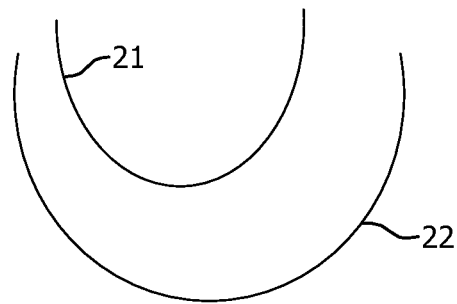
FIGS. 3*a*-3*e*—are illustrations of exemplary representations of the interface data elements and block data elements used by a connection planning module of the invention, according to one embodiment.

Referring first to FIG. 3a, there is shown two communication paths 21, 22, which may be created based on an output of the connection planning module 550 by coupling various communication system parts, e.g., 422, 411, 413, 414, 412, 423 as shown in FIG. 2, during a connection negotiation process.

Figure 3B:
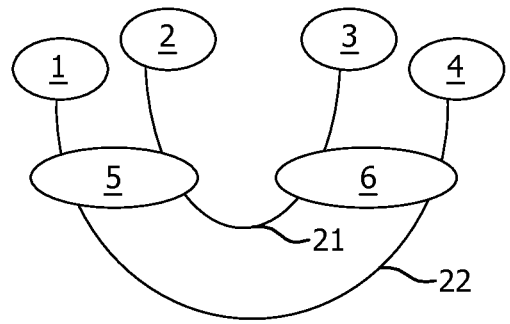

With reference to FIG. 3b, there is shown a set of interface data elements 1-6, where each interface represents or models a unique point on one of the two communication paths 21, 22 of FIG. 3a. The interfaces 1-4 are modeled as pairs, where each interface pair (1,4) and (2,3) represents a first and second end point of a communication path, where the remainder of the path is to be planned by the connection planning module 550. For example, input pair (1,4) represents the respective end points of communication path 22. The two endpoint pairs (1,4) and (2,3) are provided as input to the connection planning module 550 as a first input, i.e., input "A", as shown in FIG. 6.

The connection planning module 550 is configured to determine whether one or more communication paths can be established (are realizable) using the provided input pairs (1,4) and (2,3) as a starting point. To do so, the connection planning module 550 must compute how system elements such as, for example, elements 411, 412, 413, 414, and 415 can be used and configured to realize the communication paths 21, 22.

FIG. 3b further illustrates with interface data elements 5 and 6 that an interface, in addition to representing an end point in a communication path, can also represent an intermediate point along a communication path.

Figure 3C:
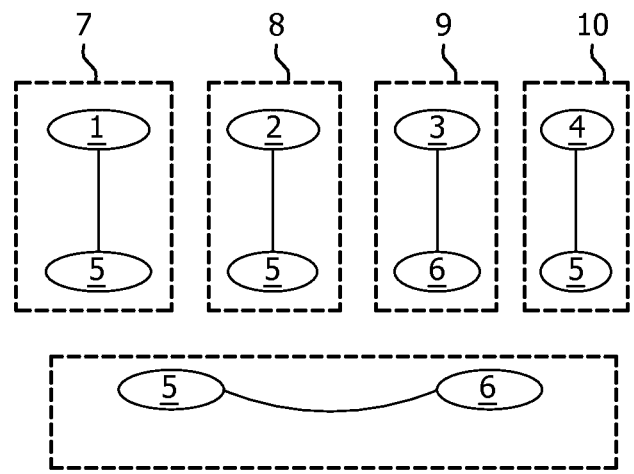

Referring now to FIG. 3c, there is shown a more abstract depiction of FIGS. 3a and 3b by substituting for the relation between interfaces that were earlier captured by the communication paths 21, 22, with the block data elements 7-11. As discussed above, a block data element represents, or models, a real world communication system element that is configured to realize a connection between two or more interfaces (i.e., two or more points along a communication path). Each block data element is drawn here with its respective set of associated interfaces depicted as ovals with numbers in them. Recall from the discussion above that a block data element minimally comprises a set of associated interface data elements, sometimes referred to herein as 'interfaces of the block'.

Figure 3D:
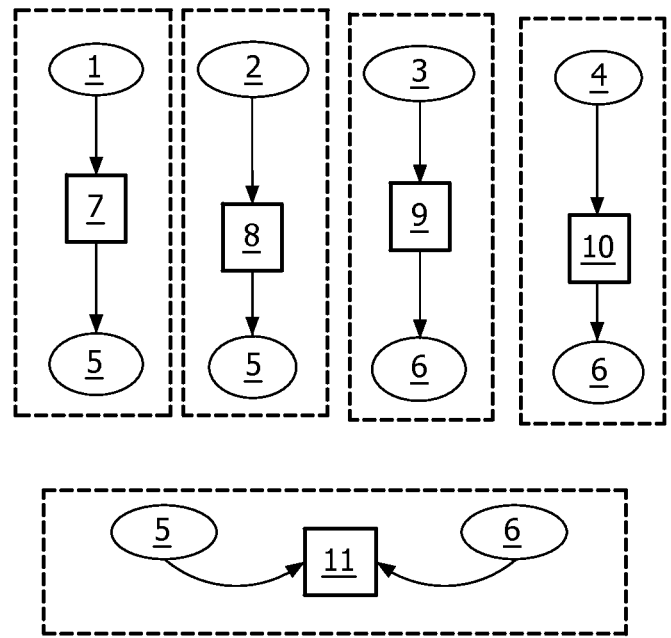

Referring now to FIG. 3d, there is shown an alternate description of the block data elements illustrated in FIG. 3c. The FIG. 3d illustration provides additional information about the blocks not shown in FIG. 3c. The additional information comprises a description of the type of relation a block has to its so-called interfaces of the block. More particularly, using arrow nomenclature, FIG. 3d further describes whether the block has a type 1 or type 2 relation to an interface in its 'set of interfaces'. For example, an arrow pointing away from an interface, such away from oval interfaces 1-4 towards rectangular blocks 7-10 describes a type 2 relation between the interfaces and the blocks. As a further example, interface 1 has a type 2 relation with block 7. An arrow pointing towards an interface, such as the arrow pointing towards interface 5 from blocks 7 and 8, respectively, and towards interface 6 from blocks 9 and 10, respectively, describes a type 1 relation between the interface and the block.

Typically, a type 1 relation between a block and an interface defines a case where the block of the interface/block pair is a user or 'requirer' of a communication service offered via the interface. A type 2 relation between a block and an interface defines a case where the block is a provider or implementer of a communications services offered via the interface. In FIG. 3d, block 11 has a type 2 relation to two interfaces 5 and 6, whereas blocks 7 and 9 have a type 1 relations to interfaces 5 and 6. Block 11 may represent a service that provides IP packet routing between the two interfaces 5 and 6—block 11 provides this service. Blocks 7 and 9 may be software modules that need to communicate with each other via routed IP packets. In this manner, blocks 7 and 9 are users of the service offered by block 11.

As discussed above, the relation between an "interface of the block" and a "block" can be of at least two types, i.e., a type 1 relation and a type 2 relation. In a preferred embodiment, only type 1 and type 2 relations are used. Other embodiments may define more relation types or sub-types other than type 1 and type 2 relations.

In other cases regarding the use of interfaces, an interface shared between two blocks may model a client-server type relation between two blocks that operate at the same protocol layer in a system. This client-server relationship can be modeled as an interface, where one side of the relationship has a type 1 relation to the interface, and the other side has a type 2 relation to the interface. An example of such a client-server relation is explained further below in relation to FIG. 4.

In other embodiments, additional relations between a block and an interface, e.g., type 3 and type 4 relations, may be used to denote client server relationships. In other embodiments, client-server pairings may be modeled by introducing other types of data elements different from interface data elements.

In some embodiments type 2 relations may be used between a block and specifically chosen interfaces to encode hardware or software limitations. In other embodiments, additional relation types, such as a type 5 relation may be used to model relations between a block and specifically chosen interfaces to encode hardware or software limitations, in lieu of using a type 2 relation.

In the preferred embodiment, a block data element also has some metadata beyond the related interfaces and relation types associated with it. For example, metadata that describes in human-readable form the block or the system element it models. Other metadata associated with a block may be used to support the computation of performance metrics, or otherwise contribute to realizing the output of the connection planning module 550 as real connections.

Figure 3E:
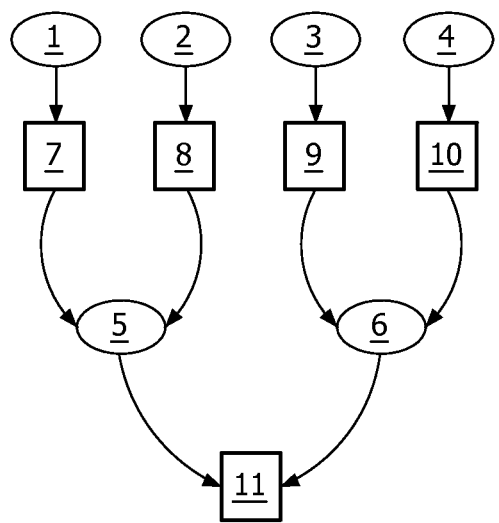

Referring now to FIG. 3e, which illustrates an alternate depiction of the set of blocks shown in FIG. 3d. In FIG. 3e, each interface is only drawn once in an attempt to mimic the look and feel of protocol stack diagrams Connection Planning Module Inputs/Outputs With reference now to FIG. 6, the connection planning module 550 is shown having two inputs to execute a connection planning process to identify a set of block data elements which are used to indicate how to realize one or more realizable communication paths between one or more dockees and one or more docking hosts, as shown for example in FIGS. 1 and 2.

In a preferred embodiment, the connection planning module 550 computes an output Tx comprised of block data elements. The output establishes one or more realizable communication paths that are both optimal, or nearly optimal, and feasible to realize given the capabilities and constraints of the devices in a communication system under consideration. Establishing the one or more realizable communication paths comprises activating and configuring the system elements which are represented by the blocks of Tx.

In the described embodiment, the connection planning module 550 is shown to receive two inputs, a first input, labeled "A" and a second input, labeled "B". The first input "A" represents a set of interface data elements M which are provided as pairs, where each pair identifies respective first and second end points of a number of planned communication paths to be realized by the connection planning module 550. For example, in the case of wireless docking, the communication paths to be realized by the connection planning module 550 are identified in the docking process as the paths connecting the application software in the dockee with all the peripheral functions that are present in the wireless docking environment with which the dockee wishes to dock.

As discussed above, the connection planning module 550 plans the communication paths based on knowing the starting and ending points of the planned communication paths. Hence, the pairs of interface data elements M represent these starting and ending points.

The second input provided to the connection planning module 550, labeled "B", represents capabilities and constraints of the devices in a communication system in addition to capabilities and constraints of any wireless and/or wired communication mediums (e.g., wifi networks) in the communication system. The second input "B" is provided to the communication planning module 550 as a set B of block data elements, as defined above.

With continued reference to FIG. 6, the output of the connection planning module 550, labeled "C", is a set Tx of block data elements, with Tx being a subset of the input set of block data elements from the set "B" representing the capabilities and constraints of the devices in the communication system. This set Tx represents a 'connection plan' from which a set of viable candidate communication paths between all end point pairs described by the first input "A" will be created. This connection plan can be used realize real-world connections between various end points in the communication system.

It is instructive to now consider how the output Tx of the connection planning module 550 can be used by the negotiation system to create the connections necessary to realize the planned communication paths selected by the connection planning module 550. As described above, the output set Tx of block data elements is derived from the input set "B" and consists of a sub-set of the set B of block data elements. Recall that a single block data element represents a system element in the communication system, optionally paired with configuration data. The configuration data specifically instructs the system element (e.g., hardware or software communication system element) represented by the block data element on how to connect between specific interfaces. In other words, block data elements include the configuration data comprising specific information instructing the devices in the communication system on how the connection to other system elements in the communication system is to be made.

Using Metadata to Create Path Connections

In the preferred embodiment, in addition to configuration data, each block has associated metadata to support the creation of planned connections. This metadata describes actions that the system must take to activate the actual system element in the communication system represented by the block FIG. 4 shows by way of example, a connection planning module 550 output Tx 400 comprised of a number of block data elements 401-405, from which an actual communication path will be created by the system. The five block data elements 401-405 are shown in FIG. 4 along with their associated interface data elements 451-456, with arrows showing type 1 and 2 relations between the interface data elements and block data elements, according to the schemes depicted in FIGS. 3*d* and 3*e*. These five block data elements of Tx 401-405 collectively constitute a plan to create a single communication path, describing a data flow from a first end point 502, from the set "M" of input "A", associated with dockee application software 422 of dockee 420 to a second end point 504, from the set "M" of input "A", associated with peripheral device, screen hardware 'Smain' 423 of docking host 421. This single communication path is also shown in FIG. 2 as communication path 500.

The five block data elements Tx 401-405 represent various system elements in the communication system. Each block data element Tx 401-405 will be described in greater detail as follows.

Block 401 represents device driver 411 in the dockee 420 which can send screen contents (e.g., screen content updates) over an IP connection. Block 401 has three associated interface data elements 451, 453 and 457. A first interface data element 451 represents the operating system interface 461 from which the screen content updates created by the application software running in the dockee, and intended for the screen 'Smain' 423 (the main screen) are to be obtained. A second interface data element 453 represents the interface 463 to the dockee subsystem that implements IP connections. A third interface data element 457 connecting block 401 to block data element 402 represents the client-server relation between system element 411 in the dockee and 412 located in docking host 'b'.

Block 401 further comprises metadata, in the form of computer-readable instructions, executable by the wireless docking software in the dockee, to create device driver 411. The metadata is used to configure this device driver to connect to the interface 461 to obtain screen updates for 'Smain' 423. The metadata further configures the driver 411 to connect over the IP network to a device driver 412 located in docking host 421, where this device driver identifies itself as being associated with 'Smain' 423. Metadata instructions could for example be expressed in ASCII string using the XML language, so that the instruction can be sent to the dockee software over a network connection, in case that the connection planning module 550 is not located in the dockee itself.

Block data element 402 represents device driver 412 in docking host 421 that receives screen content updates over an IP connection and then applies them to a real screen device.

The metadata for block 402 comprises computer-readable instructions, executable by the wireless docking software in the docking host 421 to create a device driver 412 of the above describe type, to configure it to connect to the interface 462 for the real screen 'Smain' 423 as provided by the operating system in the docking host, and further configure it to accept a connection request over the IP network from device driver 411 located in dockee 420, when device driver 411 requests to connect with the device driver associated with 'Smain' 423.

The metadata instructions described above are necessary, but not sufficient to establish the needed communication path. The two device drivers 411, 412 described above with relation to block data elements 401, 402, assume that a fast wireless network connection exists between dockee 420 and docking host 421 over which IP connections can be made. However, in wireless docking, such a fast wireless connection does usually not exist from the start. Instead, the fast wireless connection (typically a WiFi direct connection) has to be planned too by the connection planning module 550. The remaining block data elements, 403, 404, and 405 in the Tx of FIG. 4 represent the system elements involved in creating the fast network connection between dockee 420 and docking host 421, as planned by the connection planning module 550.

Block data element 403 represents WiFi network interface hardware 413 in dockee 420, configured to operate in 802.11n mode over a 5 Ghz channel, and further configured to connect to a WiFi direct network 415 hosted by the interface hardware 414 in docking host 421.

The metadata for block 403 comprises computer-readable instructions, executable by the wireless docking software in the dockee, to activate the identified wifi network hardware 413 and to configure it to operate in the described mode, and to further configure it to connect to docking host 421 via a WiFi direct network 415.

Block data element 404 represents the counterpart WiFi hardware 414 in docking host 421, configured to create a WiFi direct network 415, and to accept connections from the dockee. Block data element 404 contains computer-readable instructions to be executed by the docking host 421 to configure 414 accordingly.

Block data element 405 represents the WiFi spectrum in the 5 GHz band, which is capable of transmitting radio packets between the two WiFi interfaces. The presence of this block in the input of the connection planning module 550 indicates that the dockee 420 and the docking host 421 are within 5 GHz WiFi range of each other. This block does not have any metadata with computer-readable instructions because the spectrum already exists, and does not need to be created, activated, or configured in order to support the network 415.

It should be understood that the method for creating the communication paths by the connection planning module 550 does not rely on each communication path being separately represented in Tx. Rather, the execution of all instructions in the block metadata causes multiple communication paths, if required, to all be created while the execution process works on a block by block basis.

In some embodiments, some or all of the instructions to set up system elements would not be contained in metadata, but would instead be derived in whole or in part from the interface names through some automated process.

In some embodiments, it can be advantageous to also include metadata in each block that will lead to the system applying a certain order to the execution of the instructions contained in the metadata of different blocks. For example, an integer value 'order of instantiation' metadata element could be encoded with each block, and the software in the devices could be set up that in such way that the instructions of the blocks with the lowest order of instantiation are executed first.

With continued reference to FIG. 4, an exemplary order of instantiation could be as follows: Block 404, followed by Block 403, followed by Block 402, followed by Block 401. This order of instantiation ensures that the system elements that need to initiate connections to counterpart system elements will usually find their counterpart ready and willing to accept the connection. Though such an exemplary order or instantiation optimization can be beneficial, it is not absolutely necessary, as long as system elements are configured to re-try setting up connections if they fail initially.

Connection Planning Details

As discussed above, the connection planning module 550 creates an output labeled C in FIG. 6 comprising the set Tx as a 'connection plan' from its respective inputs, including a first input, labeled A in FIG. 6, representing the set M of endpoint pairs, and a second input labeled B in FIG. 6 representing a set B of block data elements. The output Tx of the connection planning module 550 is always a subset of input B, where B is the set of all available blocks that collectively describe all capabilities and constraints of the system. The connection plan Tx must satisfy some constraints to be realizable and therefore represents a subset of B. the block data elements that make up Tx when 'activated' according to the computer-readable instructions in their metadata, must actually create all of the intermediate segments in the set of communication paths between the communication path end points defined by the input A, i.e., the set M of endpoint pairs. In addition to satisfying certain other constraints, the activation of all blocks in Tx together should also be feasible defined herein as two blocks in Tx which may not represent configurations for a certain system element that are mutually exclusive.

Connection planning may be considered in one aspect as a searching process where different candidate subsets of the set of block data elements that is the input B are explored to find a subset of the block data elements of B, referred to herein as a realizable connection plan Tx that best satisfies a number of criteria. In order for the connection planning module 550 to test these criteria to determine if the connection plan Tx is realizable, the criteria must be computable in terms of representative blocks, their associated interface data elements and metadata.

In a preferred embodiment, four criteria are used by the connection planning module 550 to identify a realizable connection plan Tx, comprised of a particular subset of blocks, from the input set B. Other embodiments may use more or less or different criteria.

First Criteria

In order to identify a realizable a connection plan Tx, a first criteria to be satisfied comprises, identifying those interface data elements that are either contained in input "A" (the set of endpoint pairs "M") or otherwise have a type 1 relation with at least one block data element in the considered output set "Tx", and further determining that each of the identified interface data elements has a type 2 relation with at least one block data element of "Tx".

Second Criteria

A second criteria to be satisfied comprises, first identifying whether any specific block data element in "Tx" has a type 2 relation with a specific interface data element and upon satisfying the first identification, determining if the identified block data element is the only block data element in "Tx" that has a type 2 relation with this specific interface data element.

Third Criteria

Satisfying the third criteria comprises determining that it is not possible to remove one or more blocks from "Tx" resulting in a "Tx-" that still satisfies the first criteria.

The third criterion may be omitted in certain embodiments. The third criteria prevents a situation where the connection planner outputs a Tx with superfluous blocks, i.e., blocks whose inclusion is not necessary to realize the communication paths according to the first input. An example of a superfluous block would be a block that represents a superfluous configuration of a network interface, e.g. a configuration that allows the interface to send packets to a place where they never need to be sent to establish a communication path.

Fourth Criteria

The fourth criteria deals with selecting the most optimal connection plan, the one with the highest performance metric. The fourth criteria can be realized in one of two ways.

One method of implementing the fourth criteria comprises determining that, from among all subsets "T1, T2, . . . Tn" of B satisfying the first to third criteria, "Tx" is the one that has the highest performance metric, where the performance metric of a set is computed in part from metadata information encoded with the blocks in that set.

Another method of implementing the fourth criteria comprises determining that, from among those alternative subsets "T1, T2, . . . Tn" of B satisfying the first to third criteria, that have so far been considered by the connection planner, "Tx" is the one that has the highest performance metric, where the performance metric of a set is computed in part from metadata information encoded with the blocks in that set.

The fourth criterion ensures that an optimal Tx is found, one that best optimizes the performance of the realized connection plan according to the performance metric that has been used. In a preferred embodiment, the performance metric in either method of implementation discussed above is computed by using metadata attached to the blocks in Tx. For a more complete discussion of performance metrics, see section 22 of provisional application, Ser. No. 61/607,114, incorporated by reference herein in its entirety.

In accordance with the first implementation of the fourth criteria, an optimal Tx is guaranteed to be found. In accordance with the second implementation of the fourth criteria, a near-optimal Tx can be found, typically in less time than when using the first version.

It should be noted that for an input set B, the number of possible subsets Tx that might need to be examined by the connection planner grows exponentially as $2^{Size\_of\_B}$. Those skilled in the art will recognize that the computation to find a Tx satisfying the four criteria described above, using the first version of the fourth criteria, falls in the class of NP-complete problems. As is well known to practitioners regarding the handling of NP-complete problems, when the problem size becomes so large that no guaranteed-best solution Tx can be found within a reasonable computation time, certain criteria may be relaxed to identify realizable non-ideal solutions. For example, the second version of the fourth criteria is a relaxed version of the first one, which allows the connection planner to stop searching within reasonable amount of time.

Prototype Algorithmic Implementation

In a prototype implementation, a connection planning module 550 first generates all sets T1, T2, . . . Tn which satisfies the first through third criteria, and then applies the first version or implementation of the fourth criterion to select a realizable and optimal connection plan Tx.

To generate all sets T1, T2, . . . Tn a recursive (backtracking) algorithm was used that visits (potentially) all subsets of B by starting with the empty set, and recursively add certain blocks to it. For example, a block X is only recursively added to an existing set of blocks E if the block X has a type 2 relation with an interface I that is 'missing' in E, and if E+X still satisfies criterion 2 after the recursive step is performed in this iteration. An interface I is determined to be 'missing' in E if there is not already a block in Y with a type 2 relation to interface I, while at the same time I is in M, or there is a block in E with a type 1 relation to interface I. If the resulting set E+X satisfies criterion 1 (meaning it has no 'missing' interfaces anymore), it is added to the set T1, T2, . . . Tn, and further recursion is not done for E+X—this omission of further recursion means that criterion 3 is satisfied automatically by every set in T1, T2, . . . Tn.

It should be appreciated that the prototype implementation described above is only one algorithmic implementation which may be selected from among many well known algorithm implementations for solving, or approximating the solution of the NP-complete problem in relation to the invention.

Connection Planner Inputs and their Relation to the Four Criteria

Referring again to FIG. 4 which illustrates two block data elements 401 and 403 of the negotiation system which respectively represent two corresponding and adjacent system elements 411 and 413 in the communication system. Both block data elements 401, 403 have a relation to interface data element 453, which represents the real-world connection 463 between the two communication system elements 411 and 413. As described above, when encoding the blocks during a preparatory encoding stage prior to use, as preparation for the blocks being provided as one input B to the connection planning module, if a particular block, for example block 403, represents a system element that implements the services accessed over connection 463, then the relation between block 403 and block 453 is defined as a type 2 relation. If another block, for example, block 401, represents a system element that uses the services accessed over connection 463, then the relation between block 401 and block 453 is defined as a type 1 relation.

The application of the first criteria, which must be satisfied by a subset Tx of the set B of block data elements based on the first and second inputs to the connection planning module to declare the subset Tx realizable, requires that whenever a block is present that represents a system element that utilizes a service, there must be a corresponding block present that represents a system element that provides that service. Block 401, which is an element of Tx, utilizes a service. Therefore, to satisfy the first criteria, block 403 must be present in Tx to provide or implement the service to block 401, to supply a needed type 2 relation for the interface 453. That is, Block 403 provides, or implements, the system function described by the interface.

In addition, the first criterion also ensures that all of the interfaces present in the input set M which is one of the inputs to the connection planning module, must be provided for by blocks in Tx. The correct working of the connection planning module requires the use of a guideline for encoding capabilities and constraints into the blocks which make up the input set B. Stated alternatively, whenever a system element represented by a block from the set B needs additional services provided via interfaces of other system elements in B in order to function, these additional services must be encoded as type 1 interfaces of the block. Blocks providing such services must encode them as type 2 interfaces.

For those interfaces that represent client-server relations between blocks representing non-adjacent system elements in the communication system, the first criterion can ensure that there is a server for every client in the connection plan that satisfies the first criterion and is output. To ensure this requires that a guideline for encoding capabilities and constraints into the blocks is used. This guideline is that, whenever a client-server relation is present between system elements represented by two blocks, an interface data element representing this relation should be placed between them when encoding the blocks in the input B, with a type 1 relation between the interface and one of the blocks, and a type 2 relation between the interface and the other block.

The second criterion ensures that communication paths output by the connection planning module 550 are unambiguous. This second criteria guarantees that a single specific interface will only be implemented or provided by a single block, and there will only be a single server for a client to connect to. If the second criterion were omitted, then a post-processing step might need to be performed on Tx, the output of the connection planning module 550, in order to remove some ambiguities, especially ambiguities in the configuration information that tells a system element to make a connection to a specific counterpart.

The implementation of the second criterion has the further advantage that it can be leveraged by the author(s) of the block data elements to encode not just system capabilities, but also constraints. Recall that a block can represent a system element to which certain configuration data has been applied. If there are two mutually exclusive ways to configure the system element, then a preferred approach is to represent the system element by creating two block data elements, instead of one, to represent the mutually exclusive configurations of the system element, whereby both block data elements have a type 2 relation to a single given interface. The authors of the block data elements may then place these two block data elements, having different configurations in the input B, anticipating that the connection planning module will apply the second criteria, effectively preventing the connection planning module 550 from including both block data elements in the same output connection plan Tx, because including both block data elements Tx would not satisfy the second criterion.

The type 2 interface used to encode a constraint does not necessarily need to be an interface that occurs in the input set M, or as a type 1 relation interface in any other block. As an example of this, see section 20 of provisional application, Ser. No. 61/607,114, incorporated by reference herein in its entirety.

Note that the second criteria is not the only feasible way to facilitate an encoding of system constraints in terms of blocks. Alternative means are also contemplated by the invention. For example, a third interface type could be introduced, e.g., interface type 3, along with a modified second criteria that looks at the uniqueness of type 3 interfaces, instead of type 2 interfaces, such that for every interface, only a single block in Tx may have a type 3 relation with the interface.

In one embodiment, the connection planning module 550 may omit the second criteria and instead compute a set of communication paths with as many redundant branches as possible. Here, any resulting output Tx solution containing redundant branches in the form of two alternative choices for making a connection would be resolved by utilizing an algorithm that makes a choice along one preferred branch when the paths are first realized, but switches to the other branch whenever a communications failure occurs along the first branch. In this implementation, the connection planning module 550 omits the second criterion and replaces it with a different criterion to enable the encoding of system constraints.

In the preferred embodiment, interfaces are represented as ASCII strings and the criteria 1-4 as outlined above use equality testing between ASCII strings, together with testing for type 1 and 2 relations, to make their determinations. It should be appreciated that the use of relaxed equality tests between interface names, e.g., a 'matching' test instead of an equality test, is also contemplated. For example, one matching test that may be used is an ASCII sting matching test that ignores uppercase/lowercase letters. In some embodiments, interface type relations, such as type 1 or type 2 relations, might be encoded inside the interface name, with matching rules and criteria modified accordingly.

It should be appreciated that the encoding system of the invention using blocks and interfaces offers significant open-ended freedom to its users. The invention does not require that an exact description be provided describing how the capabilities and constraints of devices should be encoded into blocks. This inexactness constitutes a strength in that it allows the system to cope with new types of innovative system architectures by employing an open-ended encoding scheme to which new encodings can be added, as disclosed e.g. in section 26 of the provisional application, Ser. No. 61/607,114, incorporated by reference herein in its entirety. Particular encoding schemes that are suitable to encode blocks data elements and associated interface data elements for well-known types of system elements are disclosed in sections 17-19 of the provisional application, Ser. No. 61/607,114, incorporated by reference herein in its entirety.

The invention has the further advantage that traditional system architecture concepts like 'device driver' and 'network interface', with their boundaries being well-understood operating system interfaces and/or protocol stack layer boundaries, map neatly into system elements and blocks. Departures from regular system architecture boundaries inside a single device can also be flexibly encoded, without affecting how the blocks representing the capabilities and constraints of another device are encoded.

The overloading of traditional interfaces, e.g. the use of an IP packet delivery interface that also offers some extra real-time performance guarantees to specialized device drivers, as envisaged in e.g. the WiGig bindings for supporting HDMI and USB type functionality, can also be encoded. This is illustrated in section 18 of provisional application, Ser. No. 61/607,114.

One novel feature of the invention relates to the way in which capabilities of the wireless medium between devices is represented using blocks. For a more detailed discussion, see section 18 of provisional application, Ser. No. 61/607,114.

Figure 7:
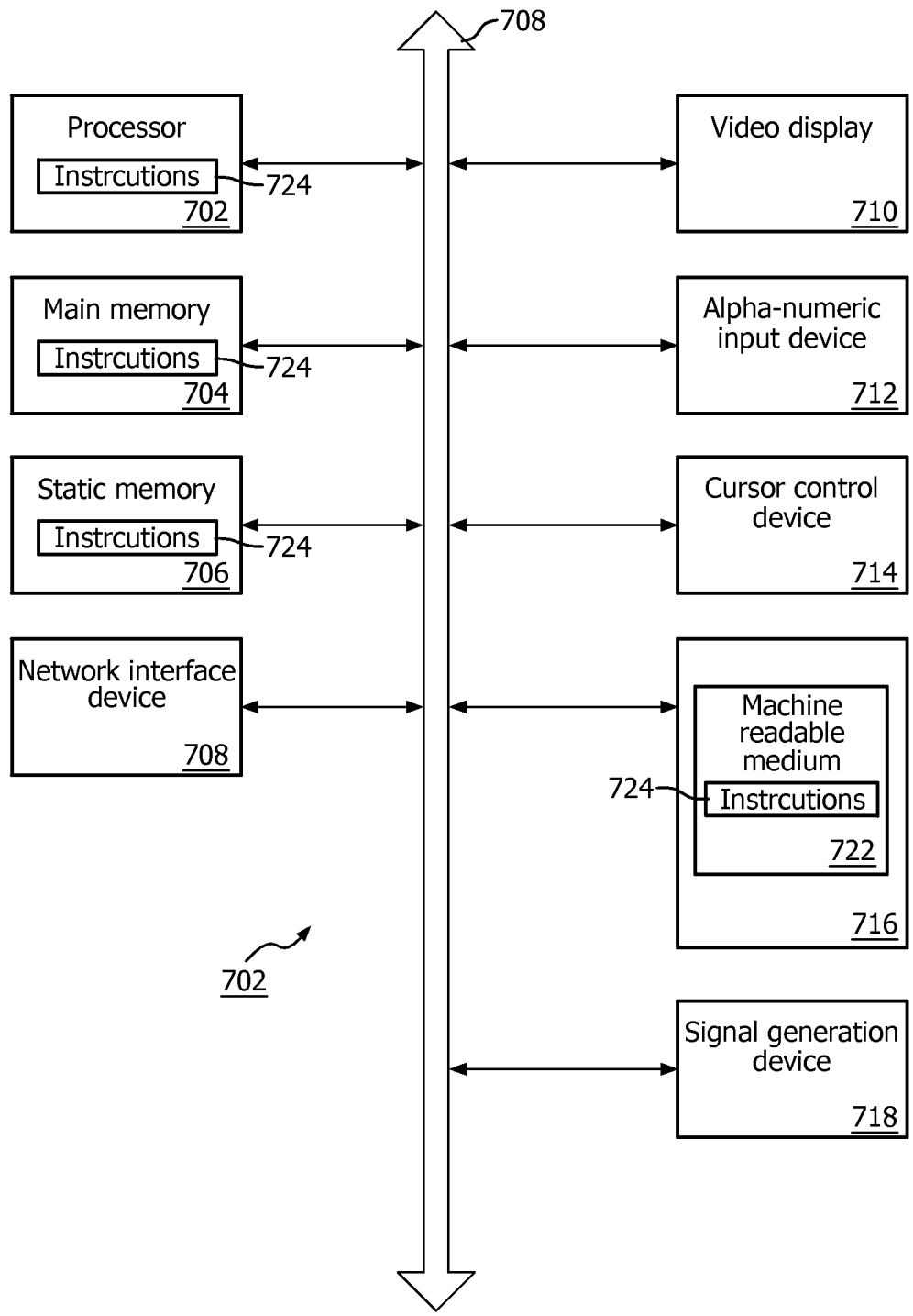
FIG. 7—depicts an illustrative diagrammatic representation of a machine in the form of a computer system within which a set of instructions, when executed, may cause the machine to perform any one or more of the methodologies discussed herein. In some embodiments, the machine operates as a standalone device. In some embodiments, the machine may be connected (using a network) to other machines. In a networked deployment, the machine may operate in the capacity of a server or a client user machine in server-client user network environment, or as a peer machine in a peer-to-peer (or distributed) network environment.

FIG. 7 depicts an illustrative diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, a personal digital assistant (PDA), a smart phone, a handheld PC, a cellular phone, and MP3 player, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (such as a central processing unit (CPU)), a graphics processing unit (GPU, or both), a main memory 704 and a static memory 706, which communicate with each other via a bus 708. The computer system 700 may further include a video display unit 710 (such as a liquid crystal display (LCD)), a flat panel, a solid state display, or a cathode ray tube (CRT). The computer system 700 may include an input device 712 (such as a keyboard), a cursor control device 714 (such as a mouse), a disk drive unit 716, a signal generation device 718 (such as a speaker or remote control) and a network interface device 720.

The disk drive unit 716 may include a computer-readable medium 722 on which is stored one or more sets of instructions (such as software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute computer-readable media. The set of instructions (such as software 724) may also reside, completely or at least partially, within the main memory 704, the static memory 706, and/or within the processor 702 during execution thereof by the computer system 700. The main memory 704 and the processor 702 also may constitute computer-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the computer-readable medium 722 is shown in an example embodiment to be a single medium, the term "computer-readable medium" should be taken to include a single medium or multiple media (such as a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (such as TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

What is claimed is:

1. A communication system including a connection negotiation system for establishing one or more communication paths between one or more pairs of end points located in devices of the communication system, wherein the communication system comprises: two or more devices, at least one communication medium situated between the two or more devices, a plurality of system elements configured to realize a part of the one or more communication paths to be established, a plurality of interface data elements representing one of (a) connection points between system elements, (b) connection points between a system element and an end point of the one or more communication paths to be established, wherein the connection negotiation system comprises at least one processor operative to:
  a) receive as a first processor input, one or more pairs of end points of the one or more communication paths to be established, said end points being located in devices of the communication system, where each end point is represented by one of the plurality of interface data elements,
  b) receive as a second processor input, a description of capabilities and constraints of the two or more devices or of the two or more devices and the at least one communication medium, wherein the capabilities and constraints are defined by a set B of block data elements, wherein a block data element in the set B of block data elements is comprised of data that represents (a) a single system element that is configured to perform a certain communication task, or (b) a single system element that cannot be configured, or (c) a single system element that is always configured in the same manner irrespective of the one or more communication paths that is supported by it, c) find a subset Tx of the set B of block data elements that satisfies at least a first criteria based on the first and second inputs, and d) output the subset Tx as a connection plan, representative of the one or more communication paths to be established in the communication system, e) execute the connection plan by at least configuring one or more system elements as specified by the subset Tx to establish the one or more communication paths in the communication system.

2. The communication system according to claim 1, wherein a system element is one of an element associated with one of the two or more devices, an element associated with the at least one communication medium, an element associated with one of the two or more devices and the at least one communication medium.

3. The communication system according to claim 1, wherein each block data element in the set B further comprises data that identifies one or more interface data elements selected from the plurality of interface data elements in the communication system, wherein said data identifying said interface data elements has a relation to said each block data element, and said data further encodes for each interface data element the type of relation between said interface data element and said each block data element, wherein the type of relation comprises one of a type 1 relation defining a block data element being a user of a communication service provided via an interface data element, or a type 2 relation defining a block data element being a provider of the communication service provided via the interface data element.

4. The communication system according to claim 3, wherein the first criteria that the subset Tx must satisfy comprises:
   identifying those interface data elements that are either contained in the first input or have a type 1 relation with at least one block data element in Tx, and
   determining that each of the identified interface data elements is the same as, or is substantially similar to, at least one interface data element that has a type 2 relation with at least one block data element of Tx.

5. The communication system according to claim 3, wherein the communication system and the negotiation system satisfy certain characteristics including:
   I. in the communication system:
      a second system element provides a needed service to a first system element,
   II. in the negotiation system:
      a) the set B of block data elements includes at least a first block data element, and a second block data element,
      b) the first block data element represents the first system element in the communication system, and the second block data element represents the second system element in the communication system, and
      c) the first and second block data elements have a respective type 1 and type 2 relation to a single interface data element.

6. The communication system according to claim 1,
   I. wherein in the communication system: a system element is configured in a first configuration to perform a first communication task and is also configured in a second configuration to perform a second communication task, wherein said system element has a limitation in that said first and second communication tasks cannot be simultaneously performed by the system element, and
   II. wherein in the negotiation system: a first block data element in the set B of block data elements represents the system element in said first configuration, and a second block data element represents the system element in said second configuration.

7. The communication system according to claim 1, wherein configuring said one or more system elements as specified by the subset Tx to establish the one or more communication paths in the communication system further comprises executing computer-readable instructions associated with certain block data elements in Tx to effect configuration of said one or more system elements.

8. A method for establishing one or more communication paths between one or more pairs of end points located in devices of a communication system comprising: two or more devices, at least one communication medium situated between the two or more devices, a plurality of system elements configured to realize a part of the one or more communication paths to be established, a plurality of interface data elements representing (a) connection points between system elements, and (b) connection points between a system element and an end point of a communication path to be established, the method comprising:

a) receiving as a first input, the one or more pairs of end points of the one or more communication paths to be established, said end points being located in devices of the communication system, where each end point is represented by one of the plurality of interface data elements, b) receiving as a second input, a description of capabilities and constraints of the two or more devices or of the two or more devices and the at least one communication medium, wherein the capabilities and constraints are defined by a set B of block data elements, wherein a block data element in the set B of block data elements is comprised of data that represents (a) a single system element that is configured to perform a certain communication task, or (b) a single system element that cannot be configured, or (c) a single system element that is always configured in the same manner irrespective of the one or more communication paths that is supported by it, c) finding a subset Tx of the set B of block data elements that satisfies at least a first criteria based on the first and second inputs, and d) outputting the subset Tx as a connection plan, representative of the one or more communication paths to be established in the communication system, and e) executing the connection plan by configuring one or more system elements as specified by the subset Tx to establish the one or more communication paths in the communication system.

9. The method according to claim 8, wherein each block data element in the set B further comprises data that identifies one or more interface data elements selected from the plurality of interface data elements in the communication system, said data identifying said interface data elements as having a relation to said each block data element, and said data further encoding for each interface data element the type of relation between said interface data element and said each block data element, wherein the type of relation comprises one of a type 1 relation defining a block data element being a user of a communication service provided via an interface data element, or a type 2 relation defining a block data element being a provider of the communication service provided via the interface data element.

11. The method according to claim 8, wherein the first criteria that the subset Tx must satisfy comprises:
identifying those interface data elements that are either contained in the first input or have a type 1 relation with at least one block data element in Tx, and
determining that each of the identified interface data elements is the same as, or is substantially similar to, at least one interface data element that has a type 2 relation with at least one block data element of Tx.

11. The method according to claim 8, wherein in the communication system: a system element is configured in a first configuration to perform a first communication task and is also configured in a second configuration to perform a second communication task, wherein said system element has a limitation in that said first and second communication tasks cannot be simultaneously performed by the system element, and in the negotiation system: a first block data element in the set B of block data elements represents the system element in said first configuration, and a second block data element represents the system element in said second configuration.

12. The method according to claim 8, wherein configuring said one or more system elements as specified by the subset Tx to establish the one or more communication paths in the communication system further comprises executing computer-readable instructions associated with certain block data elements in Tx to effect configuration of said one or more system elements.

13. A dockee in a communication system hosting a connection negotiation system for establishing one or more communication paths between one or more pairs of end points located in devices of the communication system, wherein the communication system comprises: two or more devices, at least one communication medium situated between the two or more devices, a plurality of system elements configured to realize a part of the one or more communication paths to be established, a plurality of interface data elements representing one of (a) connection points between system elements, (b) connection points between a system element and an end point of the one or more communication paths, wherein the connection negotiation system hosted by said dockee comprises at least one processor operative to:
a) receive as a first processor input, the one or more pairs of end points of the one or more communication paths to be established, said end points being located in devices of the communication system, where each end point is represented by one of the plurality of interface data elements,
b) receive as a second processor input, a description of capabilities and constraints of the two or more devices or of the two or more devices and the at least one communication medium, wherein the capabilities and constraints are defined by a set B of block data elements, wherein a block data element in the set B of block data elements is comprised of data that represents (a) a single system element that is configured to perform a certain communication task, or (b) a single system element that cannot be configured, or (c) a single system element that is always configured in the same manner irrespective of the one or more communication paths that is supported by it,
c) find a subset Tx of the set B of block data elements that satisfies at least a first criteria based on the first and second inputs, and
d) output the subset Tx as a connection plan, representative of the one or more communication paths to be established in the communication system,
e) initiate execution of the connection plan, the execution comprising configuring one or more system elements as specified by the subset Tx to establish the one or more communication paths in the communication system.

14. A docking host in a communication system hosting a connection negotiation system for establishing one or more communication paths between one or more pairs of end points located in devices of the communication system, wherein the communication system comprises: two or more devices, at least one communication medium situated between the two or more devices, a plurality of system elements configured to realize a part of the one or more communication paths to be established, a plurality of interface data elements representing (a) connection points between system elements, and (b) connection points between a system element and an end point of the one or more communication paths, wherein the connection negotiation system hosted by said docking host comprises at least one processor operative to:
a) receive as a first processor input, the one or more pairs of end points of the one or more communication paths to be established, said end points being located in devices of the communication system, where each end point is represented by one of the plurality of interface data elements,
b) receive as a second processor input, a description of capabilities and constraints of the two or more devices or of the two or more devices and the at least one communication medium, wherein the capabilities and constraints are defined by a set B of block data elements, wherein a block data element in the set B of block data elements is comprised of data that represents (a) a single system element that is configured to perform a certain communication task, or (b) a single system element that cannot be configured, or (c) a single system element that is always configured in the same manner irrespective of the one or more communication paths that is supported by it,
c) find a subset Tx of the set B of block data elements that satisfies at least a first criteria based on the first and second inputs, and
d) output the subset Tx as a connection plan, representative of the one or more communication paths to be established in the communication system, initiate execution of the connection plan, the execution comprising configuring one or more system elements as specified by the subset Tx to establish the one or more communication paths in the communication system.

\* \* \* \* \*